(12) United States Patent
Call et al.

(10) Patent No.: US 7,182,093 B2
(45) Date of Patent: Feb. 27, 2007

(54) VEHICLE PRESSURE RELIEF VALVE HAVING CENTRALLY SECURED FLAPS AND METHOD OF MANUFACTURING THE SAME

(75) Inventors: David Call, Sterling, MA (US); Thomas E. Blake, III, South Lyon, MI (US); Daniel D. Carlson, Fenton, MI (US); John J. Strzempko, Ashburnham, MA (US); Brenda Schworer, Barre, MA (US)

(73) Assignee: TRW Automotive U.S. LLC, Livonia, MI (US)

( * ) Notice: Subject to any disclaimer, the term of this patent is extended or adjusted under 35 U.S.C. 154(b) by 266 days.

(21) Appl. No.: 10/706,509

(22) Filed: Nov. 12, 2003

(65) Prior Publication Data

US 2005/0098215 A1  May 12, 2005

(51) Int. Cl.
 *F16K 15/14* (2006.01)
(52) U.S. Cl. .............................. 137/15.18; 137/512.15; 137/854; 137/855; 454/162
(58) Field of Classification Search ........... 137/512.15, 137/15.18, 854, 855; 454/162, 164, 165
See application file for complete search history.

(56) References Cited

U.S. PATENT DOCUMENTS

| | | | |
|---|---|---|---|
| 1,634,949 A * | 7/1927 | Le Valley | 137/512.15 |
| 2,859,771 A | 11/1958 | Blagg | |
| 4,204,555 A | 5/1980 | Durling | |
| 4,565,214 A | 1/1986 | Parman | |
| 5,413,599 A | 5/1995 | Imachi et al. | |
| 5,695,397 A * | 12/1997 | Frank et al. | 454/164 |
| 5,904,618 A * | 5/1999 | Lewis | 454/162 |
| 5,996,631 A | 12/1999 | Thronton | |
| 6,237,621 B1 | 5/2001 | Chaffee | |
| 6,357,473 B1 * | 3/2002 | Porter et al. | 137/512.15 |
| 6,468,148 B1 * | 10/2002 | Furusawa et al. | 454/164 |
| 6,508,264 B2 | 1/2003 | Chaffee | |
| 2002/0164943 A1 * | 11/2002 | Misner | 454/164 |

\* cited by examiner

*Primary Examiner*—Ramesh Krishnamurthy
(74) *Attorney, Agent, or Firm*—Tarolli, Sundheim, Covell & Tummino LLP

(57) ABSTRACT

A pressure relief valve (12) for relieving air pressure from a passenger compartment (14) of a vehicle (10) includes a base (18) having a central portion (26) and a peripheral portion (28). A plurality of openings (46) extends through the base (18) and a plurality of flaps (60) closes the openings (46). Each flap (60) is associated with at least one opening (46). An inner end (66) of each flap (60) connects with the central portion (26) of the base (18). An outer end (68) of each flap (60) is movable relative to the central portion (26) of the base (18) and the other flaps for enabling airflow through the at least one associated opening (46). The pressure relief valve (12) further includes a connector (22) on the base (18) that is configured for securing the pressure relief valve (12) to the vehicle (10).

11 Claims, 5 Drawing Sheets

VEHICLE PRESSURE RELIEF VALVE HAVING CENTRALLY SECURED FLAPS AND METHOD OF MANUFACTURING THE SAME

TECHNICAL FIELD

The present invention relates to a pressure relief valve and a method of manufacturing the same. More particularly, the present invention relates to a pressure relief valve for relieving pressure from a passenger compartment of a vehicle and the method of manufacturing the pressure relief valve.

BACKGROUND OF THE INVENTION

Pressure relief valves for relieving pressure from a passenger compartment of a vehicle are known. Conventional pressure relief valves include a gate that opens when a differential air pressure between the passenger compartment of the vehicle and atmosphere reaches a predetermined level. For example, when a vehicle door is slammed closed, the air pressure within the passenger compartment is likely to increase suddenly. In response to an increase in air pressure within the passenger compartment, the gate of the pressure relief valve is actuated into an open position to relieve the pressure within the passenger compartment. The conventional pressure relief valve is a one-way valve that only allows airflow from the passenger compartment to atmosphere and prevents airflow from atmosphere into the passenger compartment.

SUMMARY OF THE INVENTION

The present invention relates to a pressure relief valve for relieving air pressure from a passenger compartment of a vehicle. The pressure relief valve comprises a base having a central portion and a peripheral portion. A plurality of openings extends through the base. The pressure relief valve also comprises a plurality of flaps for closing the openings of the base. Each flap is associated with at least one opening of the plurality of openings and includes opposite surfaces against which air pressure acts. An inner end of each flap connects with the central portion of the base. An outer end of each flap is movable relative to the central portion of the base and the other flaps in response to differential air pressure acting on the opposite surfaces for enabling airflow through the at least one associated opening. The pressure relief valve further comprises a connector on the base that is configured for securing the pressure relief valve to the vehicle.

The present invention also relates to a method of forming a pressure relief valve for relieving air pressure from a passenger compartment of a vehicle. During the method, a base having a central portion and a peripheral portion is provided. A plurality of openings extends through the base. The openings of the base are closed with a plurality of flaps by associating each flap with at least one opening, connecting an inner end of each flap with the central portion of the base, and enabling an outer end of each flap to move relative to the central portion of the base and the other flaps in response to differential pressure acting on opposite surfaces of the flap for enabling airflow through the associated at least one opening. The method also includes the step of providing a connector on the base that is configured for securing the pressure relief valve to the vehicle.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
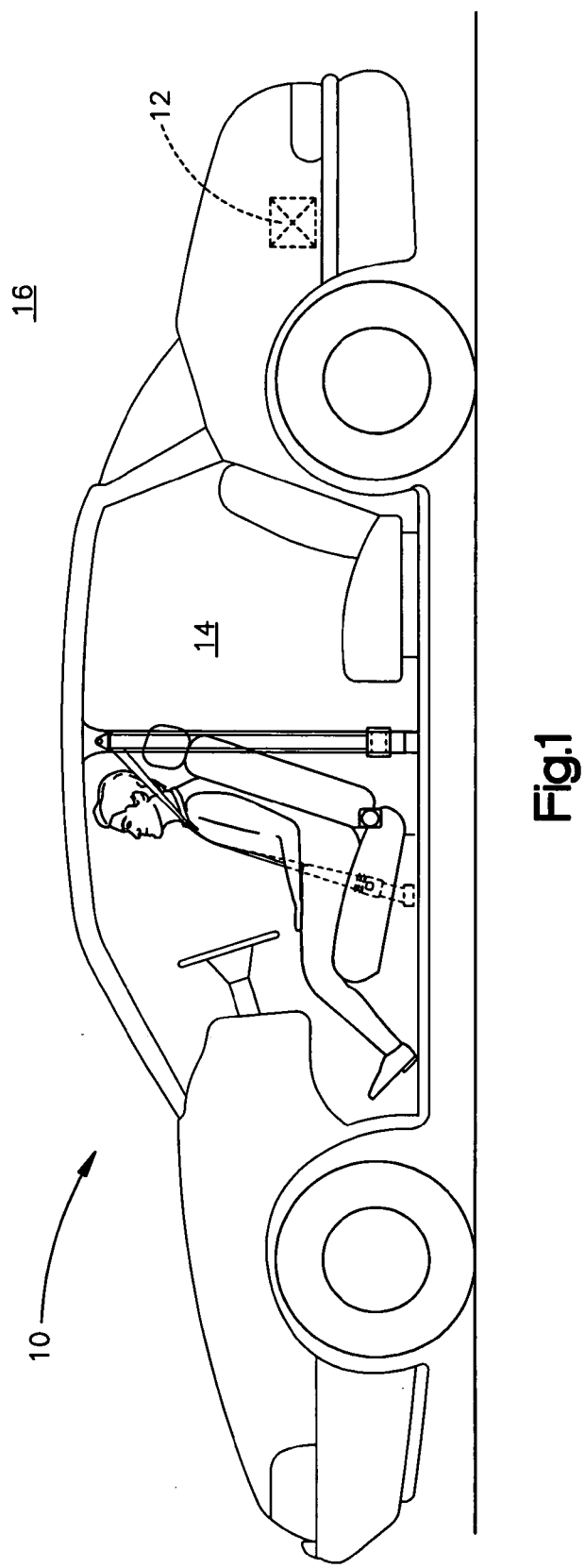
FIG. 1 is a partially cutaway side view of a vehicle including a pressure relief valve constructed in accordance with the present invention.

FIG. 1 is a side view of a vehicle 10 including a pressure relief valve 12 constructed in accordance with the present invention. The pressure relief valve 12 separates the passenger compartment 14 of the vehicle 10 from atmosphere 16 and is operable to relieve pressure from the passenger compartment 14 of the vehicle 10. In FIG. 1, the pressure relief valve 12 is located in the trunk of the vehicle 10. The pressure relief valve 12 may be located at other locations on the vehicle 10.

Figure 2:
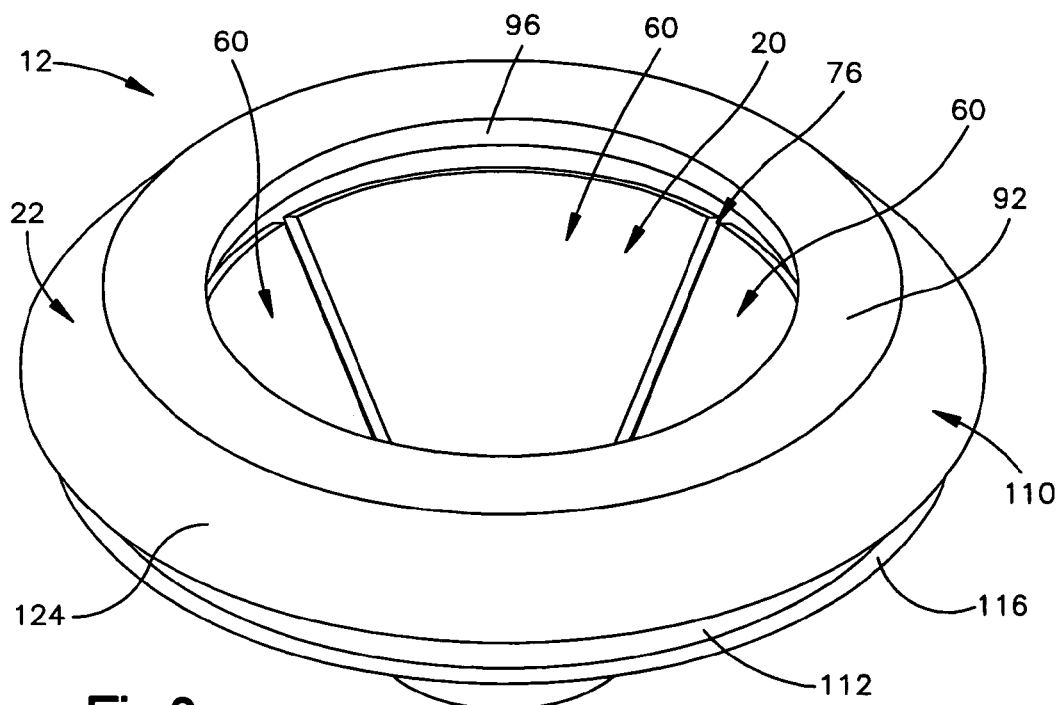
FIG. 2 is a perspective view of a pressure relief valve constructed in accordance with the present invention.
Figure 5:
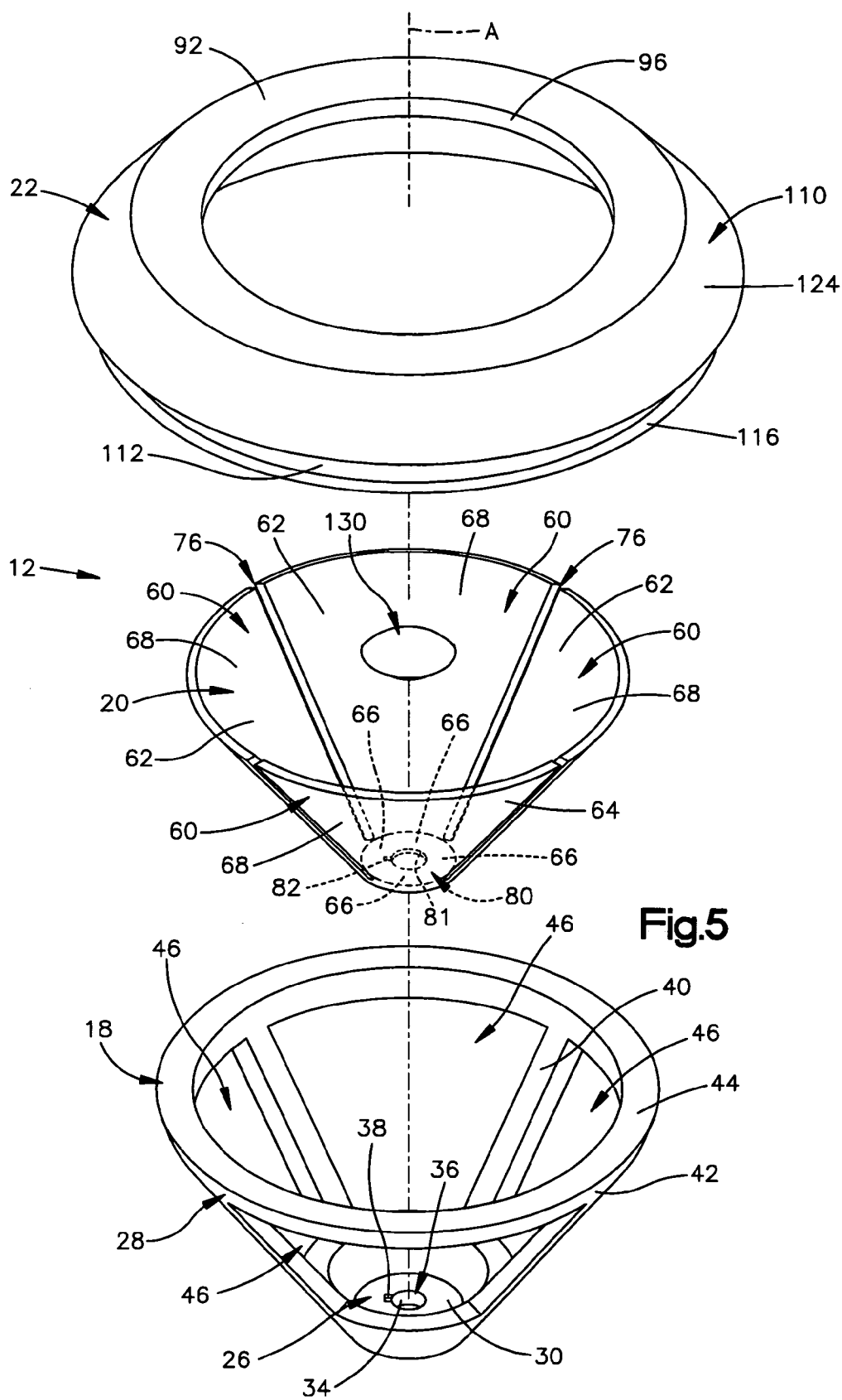
FIG. 5 is an exploded perspective view of the pressure relief valve of FIG. 2.

FIG. 2 illustrates a perspective view of an exemplary embodiment of a pressure relief valve 12 constructed in accordance with the present invention. An exploded perspective view of the pressure relief valve 12 of FIG. 2 is shown in FIG. 5. The pressure relief valve 12 includes a base 18, a flexible closure member 20, and a rim 22.

As shown in FIG. 5, the base 18 is bowl shaped and includes a central portion 26 and a peripheral portion 28. The central portion 26 of the base 18 illustrated in FIG. 5 is annular and is centered on axis A. The central portion 26 is planar and includes upper and lower surfaces 30 and 32, respectively, and a radial inner surface 34. The upper and lower surfaces 30 and 32 extend parallel to one another. The radial inner surface 34 extends perpendicular to the upper and lower surfaces 30 and 32 and connects the upper and lower surfaces 30 and 32. The radial inner surface 34 defines a circular hole 36 that extends through the central portion 26 of the base 18. A rectangular orientation key 38 extends upwardly from the upper surface 30 of the central portion 26 adjacent the radial inner surface 34.

The peripheral portion 28 of the base 18 is frustoconical and extends upwardly and radially outwardly, relative to axis A, from the central portion 26 of the base 18. The peripheral portion 28 of the base 18 includes radial inner and outer surfaces 40 and 42, respectively, and an upper surface 44. The radial inner surface 40 of the peripheral portion 28 extends upwardly and radially outwardly from the upper surface 30 of the central portion 26. The radial outer surface 42 of the peripheral portion 28 extends upwardly and radially outwardly from the lower surface 32 of the central portion 26. The radial outer surface 42 extends parallel to the radial inner surface 40 so that the peripheral portion 28 of the base 18 has a uniform thickness throughout. The upper surface 44 of the peripheral portion 28 connects the radial inner and outer surfaces 40 and 42 and extends parallel to the upper surface 30 of the central portion 26.

Figure 3:
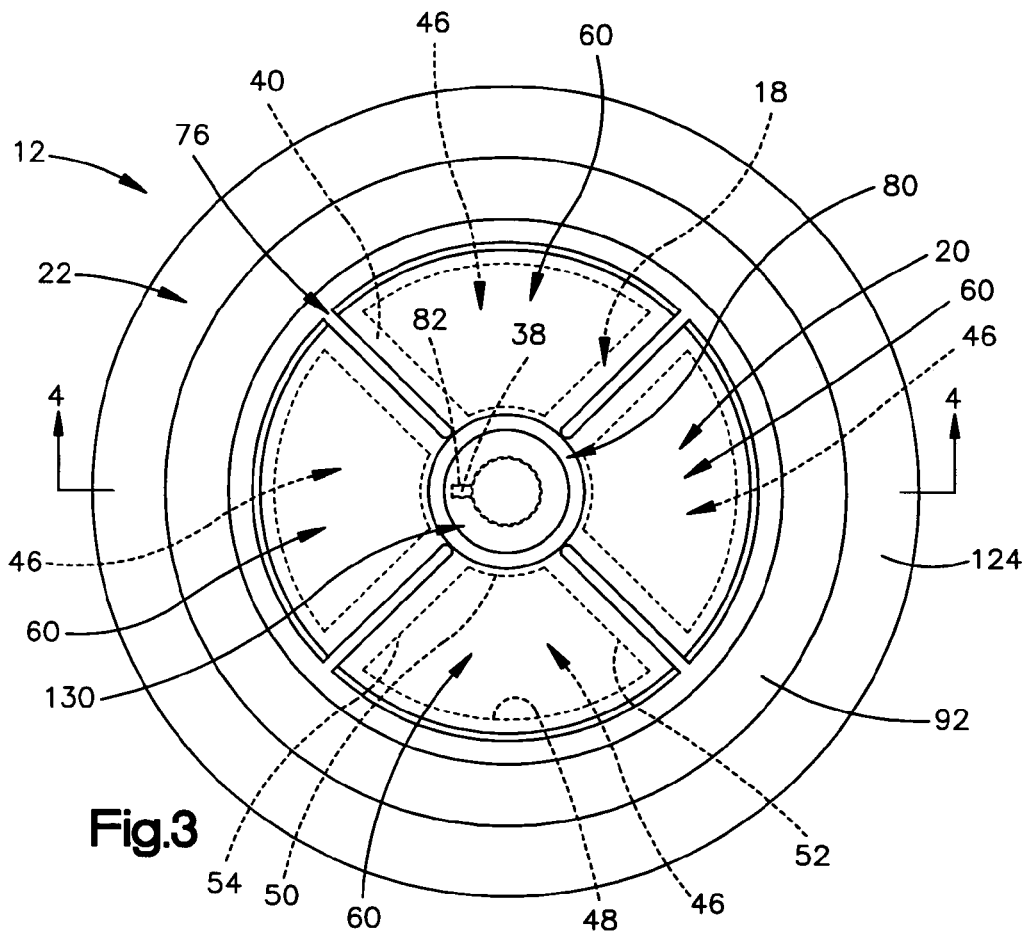
FIG. 3 is a plan view of the pressure relief valve of FIG. 2.
Figure 4:
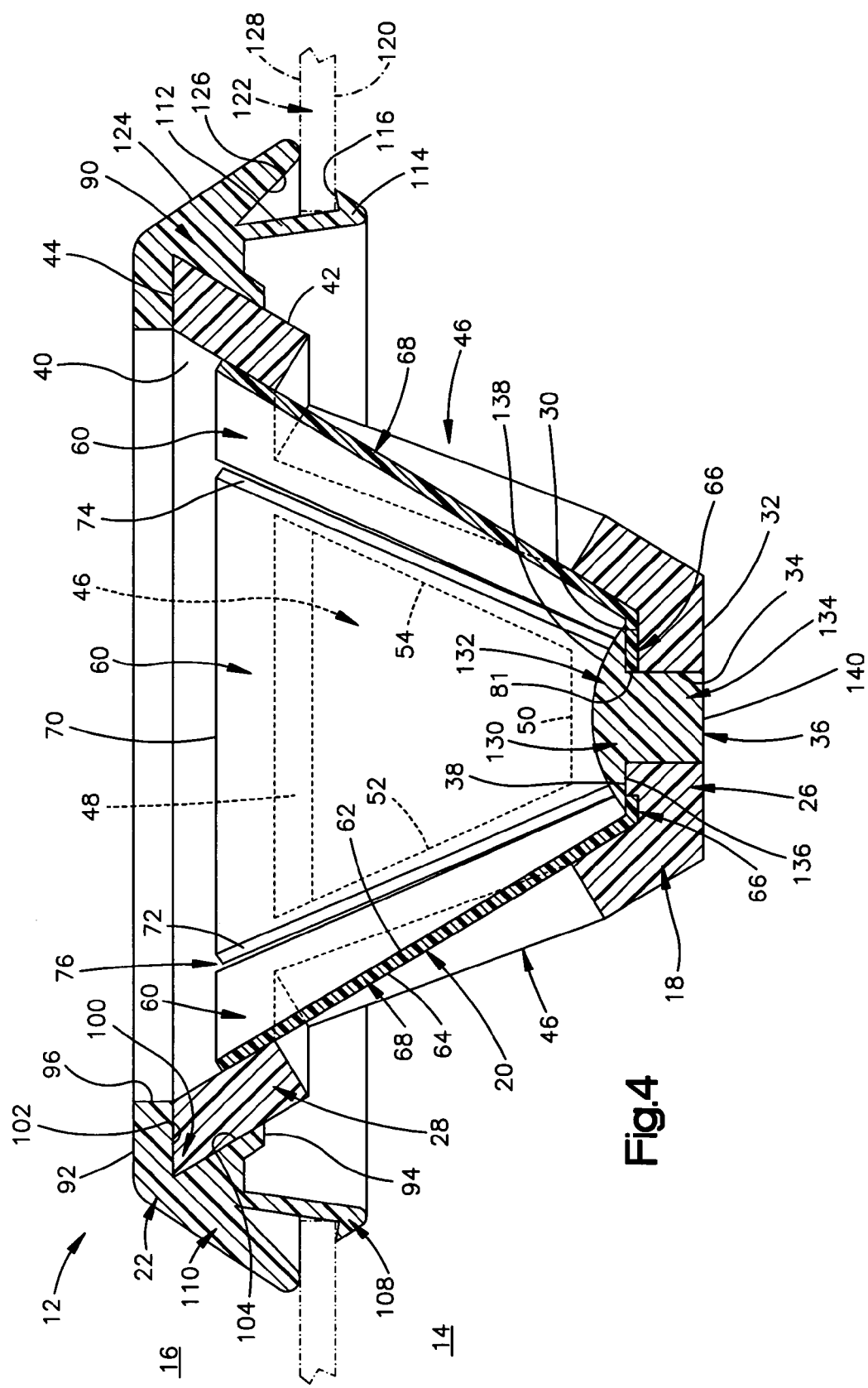
FIG. 4 is a view taken along line 4—4 in FIG. 3.

A plurality of openings 46 extends through the peripheral portion 28 of the base 18. The base 18 illustrated in FIGS. 2–5 has four openings 46 extending through the peripheral portion 28. The four openings 46 are identical in size to one another and, as shown in FIG. 5, are spaced in an array about axis A. Each of the openings 46 is generally trapezoidal in shape and narrows nearer the central portion 26 of the base 18. As shown with respect to an exemplary opening 46 in FIGS. 3 and 4, parallel upper and lower surfaces 48 and 50, respectively, and first and second side surfaces 52 and 54, respectively, define each of the openings 46 in the peripheral portion 28 of the base 18. As best shown in FIG. 4, the upper surfaces 48 of each opening 46 has a length, between the first and second side surfaces 52 and 54, that is approximately three times longer than a length, between the first and second side surfaces 52 and 54, of the lower surface 50 of the opening 46. Each of the upper and lower surfaces 48 and 50 and the first and second side surfaces 52 and 54 that define the opening 46 extends perpendicular to the radial inner and outer surfaces 40 and 42 of the peripheral portion 28 of the base 18.

The flexible closure member 20 of the pressure relief valve 12 includes a plurality of flaps 60. The flexible closure member 20 of FIGS. 2–5 includes four flaps 60. Each flap 60 has opposite upper and lower surfaces 62 and 64, respectively, and includes inner and outer ends 66 and 68, respectively. The outer end 68 of each flap 60 is generally trapezoidal and is defined by an upper end surface 70 (FIG. 4) and first and second side surfaces 72 and 74 (FIG. 4), respectively. The upper end surface 70 forms the widest portion of the flap 60 and has a width, between the first and second side surfaces 72 and 74, that is greater than the length of the upper surface 48 of an opening 46 in the base 18. The first and second side surfaces 72 and 74 of each flap 60 are angled relative to one another so that the flap 60 narrows toward the inner end 66. A slot 76 (FIG. 5) separates the second side surface 74 of each flap 60 from the first side surface 72 of an adjacent flap 60 and enables movement of the flap relative to the adjacent flap.

The inner end 66 of each flap 60 is angled relative to the outer end 68 of the flap. In the exemplary embodiment shown in FIG. 4, the inner end 66 of each flap 60 is angled relative to the outer end 68 of the flap 60 at an angle of approximately one hundred and twenty degrees. The inner end 66 of each flap 60 is connected to the inner end 66 of each adjacent flap 60 so that the inner ends, collectively, form an undivided, annular center portion 80 (FIG. 5) of the flexible closure member 20. The annular center portion 80 of the flexible closure member 20 is centered on axis A and has an outer diameter equal to the diameter of the upper surface 30 of the central portion 26 of the base 18. An inner diameter 81 of the annular center portion 80 of the flexible closure member 20 is equal to the diameter of the circular hole 36 defined by the radial inner surface 34 of the central portion 26 of the base 18. The annular center portion 80 of the flexible closure member 20 is planar and includes a rectangular cutout 82 (FIG. 5) adjacent the inner diameter 81. The rectangular keyway or cutout 82 is sized to receive the orientation key 38 on the upper surface 30 of the central portion 26 of the base 18 for aligning the flexible closure member 20 with the base 18.

The rim 22 of the pressure relief valve 12 has an annular main body portion 90 (FIG. 4) that is centered on axis A. The main body portion 90 includes an upper surface 92, a stepped lower surface 94, and an annular inner surface 96. A diameter of the annular inner surface 96 is equal to or slightly greater than an inner diameter of the upper surface 44 of the peripheral portion 28 of the base 18.

An annular pocket 100 (FIG. 4) extends into the main body portion 90 of the rim 22. An upper surface 102 and a lower surface 104 define the annular pocket 100. The upper surface 102 extends parallel to the upper surface 92 of the main body portion 90. The lower surface 104 is angled relative to the upper surface 102 and intersects the upper surface 102 to define the annular pocket 100.

Interior and exterior locking members 108 and 110, respectively, extend from the main body portion 90 of the rim 22. The interior locking member 108 is annular and includes a spacer portion 112 and a hooked portion 114. The spacer portion 112 extends downwardly, as viewed in FIG. 4, and radially outwardly from the main body portion 90 of the rim 22. The hooked portion 114 of the interior locking member 108 is formed on an end of the spacer portion 112 opposite the main body portion 90 of the rim 22. The hooked portion 114 extends radially outwardly from the spacer portion 112 and includes a surface 116 for engaging and sealing against an interior surface 120 of a panel 122 (shown by dashed lines in FIG. 4) of the vehicle 10.

The exterior locking member 110 of the rim 22 is an annular tapered member that extends downwardly, as viewed in FIG. 4, and radially outwardly of the main body portion 90 of the rim 22. The exterior locking member 110 includes upper and lower surfaces 124 and 126, respectively. The upper surface 124 of the exterior locking member 110 extends downwardly and radially outwardly from the upper surface 92 of the main body portion 90 of the rim 22. The lower surface 126 of the exterior locking member 110 terminates near a midpoint of the main body portion 90. The exterior locking member 110 narrows as it extends downwardly and radially outwardly from the main body portion 90 of the rim 22. The exterior locking member 110 is flexible and is designed to engage and seal against an exterior surface 128 of the panel 122 (shown by dashed lines in FIG. 4) of the vehicle 10.

The pressure relief valve 12 also includes a fastener 130 for securing the annular center portion 80 of the flexible closure member 20 to the central portion 26 of the base 18. The fastener 130 includes a head portion 132 and a shank portion 134. The head portion 132 includes a flat lower surface 136 and a rounded upper surface 138. The shank portion 134 is cylindrical and has an outer diameter that is equal to the diameter of the hole 36 defined by the radial inner surface 34 of the central portion 26 of the base 18. The shank portion 134 of the fastener 130 terminates at an end opposite the head portion 132 with an end surface 140.

The pressure relief valve 12 of the present invention is manufactured in a two-shot molding process. Prior to the molding process, the flexible closure member 20 is manufactured. The flexible closure member 20 may be made from a Mylar film, polyester, or a polycarbonate-based material. The flexible closure member 20 is preformed into the frustoconical shape illustrated in FIG. 5. Preferably, the flexible closure member 20 is preformed from a single piece of sheet material having a thickness in the range of 3–7 thousandths of an inch.

The two-shot molding process may be performed in a single two-shot injection molding machine or, alternatively, may be performed in two separate, one-shot injection molding machines. The first shot of the injection molding process forms the base 18 of the pressure relief valve 12. The base 18 is formed as a monolithic structure that is free from any connecting devices or fasteners. The base 18 is formed from a homogenous material, preferably a polypropylene or thermoplastic and has a uniform density throughout.

After the base 18 is molded, the preformed flexible closure member 20 is placed on the base 18. The flexible closure member 20 is placed over the base 18 so that the rectangular cutout 82 in the flexible closure member 20 receives the orientation key 38 on the upper surface 30 of the central portion 26 of the base 18. When the rectangular cutout 82 in the flexible closure member 20 receives the orientation key 38 of the base 18, each of the flaps 60 of the flexible closure member 20 covers or closes an associated opening 46 in the peripheral portion 28 of the base 18. As a result, the slots 76 that separate adjacent flaps 60 of the flexible closure member 20 are positioned on the radial inner surface 40 of the peripheral portion 28 of the base 18 in an area between adjacent openings 46, as is shown in FIG. 3. The radial inner surface 40 of the peripheral portion 28 of the base 18 supports each flap 60 over its associated opening 46.

The second shot of the injection molding process forms the rim 22 of the pressure relief valve 12. The rim 22 is also formed as a monolithic structure that is free from any connecting devices or fasteners. The rim 22 is formed from a homogenous material, preferably a thermoplastic elastomer, and has a uniform density throughout. An exemplary thermoplastic elastomer would be a TPV (thermoplastic vulcanizate) such as SANTOPRENE.

The rim 22 is molded directly onto the peripheral portion 28 of the base 18. The annular pocket 100 in the rim 22 is formed by molding the rim 22 directly over the junction of the upper surface 44 and the radial outer surface 42 of the peripheral portion 28 of the base 18. During the molding process, the peripheral portion 28 of the base 18 forms a portion of the mold for the rim 22. Since the rim 22 is molded directly onto the base 18, the material used to form the rim 22 must have a melting point that is lower than the melting points of the materials of the base 18.

The second shot of the molding process may also form the fastener 130 with the shank portion 134 secured in the hole 36 of the central portion 26 of the base 18 and the head portion 132 overlaying the center portion 80 of the flexible closure member 20. When molded during the second shot of the injection molding process, the fastener 130 is formed from the same material as the rim 22. During the second shot of the injection molding process, the center portion 80 of the flexible closure member 20 overlies the upper surface 30 of the central portion 26 of the base 18. The central portion 26 of the base 18 and the center portion 80 of the flexible closure member 20 form a portion of a mold for forming the fastener 130. Thus, the material used to form the fastener 130 must have a melting point that is lower than the melting points of the materials of the base 18 and the flexible closure member 20.

The fastener 130 fixedly secures the center portion 80 of the flexible closure member 20, i.e., the inner ends 66 of the flaps 60, to the central portion 26 of the base 18. The molded fastener 130 chemically bonds to the radial inner surface 34 of the base 18. Alternatively, a mechanical bond may be formed between the molded fastener 130 and the radial inner surface 34 of the base 18 using known methods. When the fastener 130 is molded, the end surface 140 of the shank portion 134 of the molded fastener 130 can be aligned with the lower surface 32 of the central portion 26 of the base 18, as shown in FIG. 4, or alternatively, may overlap the lower surface 32 of the central portion 26 of the base 18.

When the fastener 130 is pre-manufactured, the fastener 130 is inserted into the hole 36 in the central portion 26 of the base 18 to secure the center portion 80 of the flexible closure member 20 to the central portion 26 of the base 18. The pre-manufactured fastener 130 may have a shank portion 134 with a diameter that is slightly larger than the radial inner surface 34 of the base 18 so that an interference fit is formed between the shank portion 134 of the fastener 130 and the radial inner surface 34. The fastener 130 may be inserted into the hole 36 either before or after the rim 22 is molded onto the peripheral portion 28 of the base 18. Preferably, the rim 22 molded onto the base 18 prior to the fastener attaching the flexible closure member 20 to the base 18. The manufacture of the pressure relief valve 12 of the present invention is complete after the fastener 130 secures the flexible closure member 20 to the base 18 and the rim 22 is molded onto the peripheral portion 28 of the base 18.

The pressure relief valve 12 of the present invention acts as a check valve or a one-way valve. The pressure relief valve 12 enables airflow from the passenger compartment 14 of the vehicle 10 to atmosphere 16, but prevents airflow from atmosphere 16 into the passenger compartment 14 of the vehicle 10. By preventing airflow from atmosphere 16 into the passenger compartment 14 of the vehicle 10, the pressure relief valve 12 of the present invention helps to prevent atmospheric noise, dust, and carbon monoxide from entering the passenger compartment 14 of the vehicle 10.

The pressure relief valve 12 of the present invention is operable in response to differential air pressure between the passenger compartment 14 of the vehicle 10 and atmosphere. FIG. 4 illustrates the location of the passenger compartment 14 and atmosphere 16 relative to the pressure relief valve 12 when mounted to a panel 122 of the vehicle 10. FIG. 4 also illustrates the flaps 60 of the pressure relief valve 12 in a closed position relative to the base 18. The flaps 60 of the flexible closure member 20 have a tendency to return to the closed position. Thus, when air pressure within the passenger compartment 14 of the vehicle 10 and atmospheric pressure are equal, the flaps 60 of the pressure relief valve 12 will remain in a closed position.

When atmospheric pressure increased above the air pressure within the passenger compartment 14 of the vehicle 10, the atmospheric pressure acts downwardly, as viewed in FIG. 4, against the flaps 60 of the flexible closure member 20. Since the flaps 60 are supported on the radial inner surface 40 of the peripheral portion 28 of the base 18, the flaps 60 of the flexible closure member 20 remain in the closed position and do not move relative to the base 18 in response to the increased atmospheric pressure. As a result, airflow from the atmosphere 16 into the passenger compartment 14 of the vehicle 10 is prevented.

When the air pressure within the passenger compartment 14 of the vehicle 10 increased above atmospheric pressure, the air pressure within the passenger compartment 14 acts upwardly, as viewed in FIG. 4, against the flaps 60 of the flexible closure member 20. When the air pressure within the passenger compartment 14 is greater than atmospheric pressure by a predetermined level, i.e., a level to overcome the tendency of the flaps 60 to return to the closed position, the outer ends 68 of the flaps 60 move upwardly and radially inwardly, as viewed in FIG. 4, to enable airflow from the passenger compartment 14 to atmosphere 16. When the outer ends 68 of the flaps 60 move to enable airflow from the passenger compartment 14 to atmosphere 16, the flaps 60 are in an open position. When the differential air pressure between the passenger compartment 14 of the vehicle 10 and atmosphere 16 falls below the predetermined level, the tendency of the flaps 60 to return to the closed position causes the flaps 60 to move from the open position to the closed position. An additional benefit of the tendency of the flaps 60 to return to the closed position is that the pressure relief valve 12 operates independent of gravity and may be mounted on the vehicle 10 in any orientation.

Figure 6:
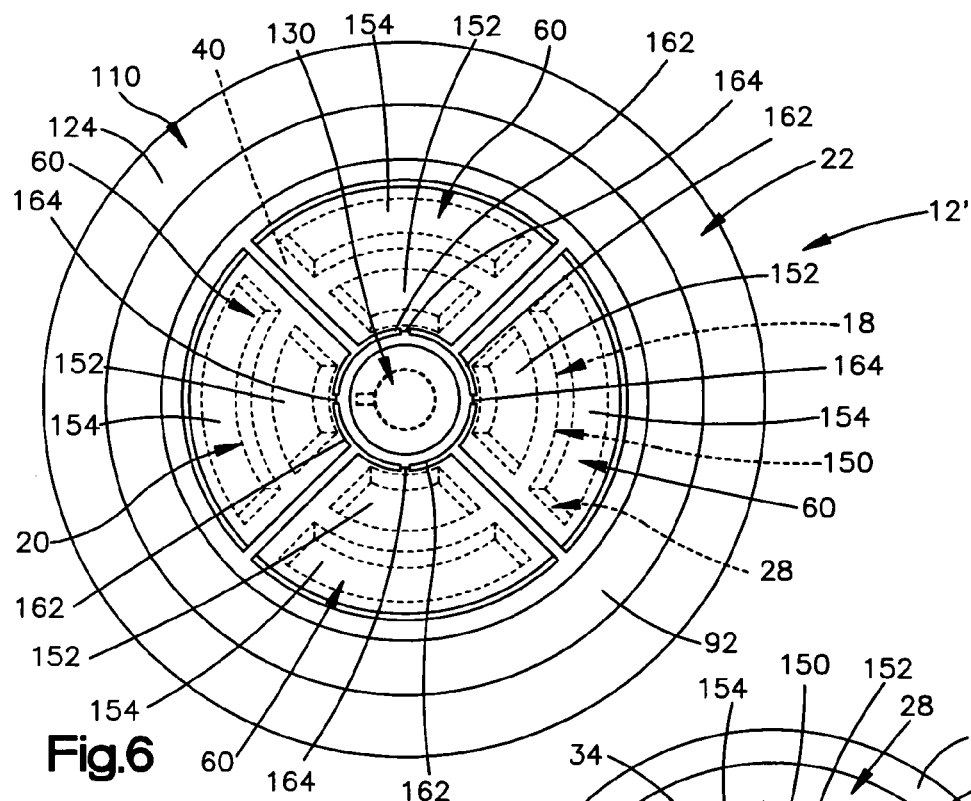
FIG. 6 is a plan view of a pressure relief valve constructed in accordance with a second embodiment of the present invention.

FIG. 6 is a plan view of a pressure relief valve 12' constructed in accordance with a second embodiment of the present invention. Structure of the pressure relief valve 12' of FIG. 6 that are similar to or perform the same function as structure of the pressure relief valve 12 illustrated in FIGS. 2–5 are referred to using the same reference numbers.

Figure 7:
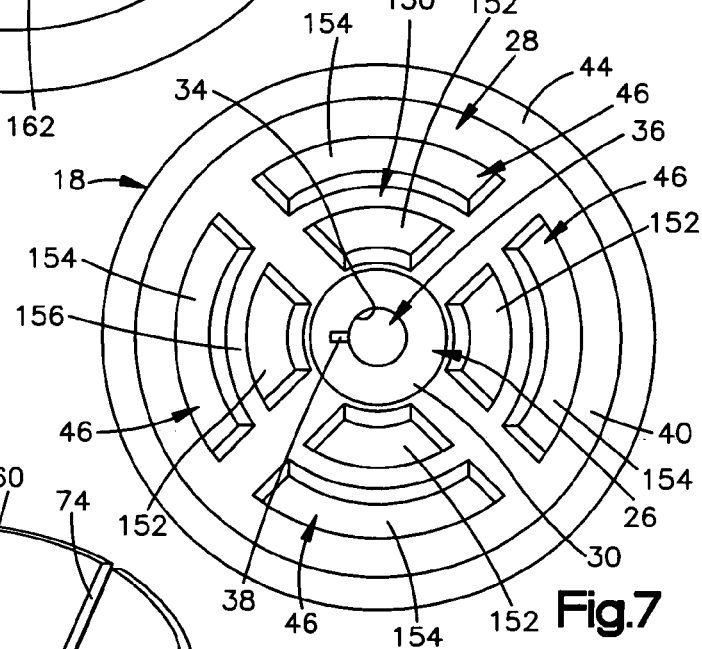
FIG. 7 is a plan view of a first portion of the pressure relief valve of FIG. 6.

FIG. 7 is a plan view of the base 18 for the pressure relief valve 12' of FIG. 6. The peripheral portion 28 of the base 18 includes an annular support portion 150 that intersects each of the openings 46 in the peripheral portion 28 of the base 18. The annular support portion 150 divides each opening 46 into a narrow trapezoidal opening 152 and a wider trapezoidal opening 154. The narrow trapezoidal opening 152 is located between the central portion 26 of the base 18 and the wider trapezoidal opening 154.

The annular support portion 150 includes a portion 156 of the radial inner surface 40 of the peripheral portion 28 of the base 18. The annual support portion 150 of the base 18 provides additional support for the outer end 68 of each flap 60 when the flap 60 is in the closed position and provides further resistance against movement of the flap 60 in response to increased atmospheric pressure.

Figure 8:
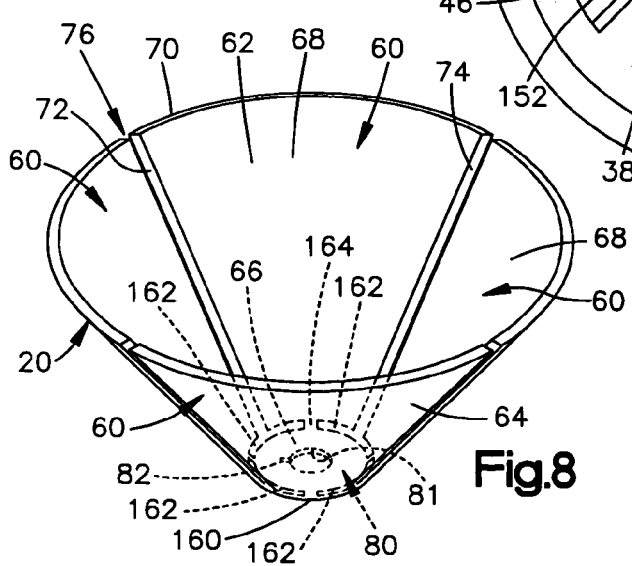
FIG. 8 is a plan view of a second portion of the pressure relief valve of FIG. 6.

FIG. 8 is a perspective view of the flexible closure member 20 for the pressure relief valve 12' of FIG. 6. The flexible closure member 20 includes four flaps 60. Each flap 60 has opposite upper and lower surfaces 62 and 64, respectively, and includes inner and outer ends 66 and 68, respectively, shown on an exemplary flap 60. The outer end 68 of each flap 60 is generally trapezoidal and includes an upper end surface 70 and first and second side surfaces 72 and 74, respectively. The upper end surface 70 forms the widest portion of the flap 60 and has a width that is greater than a width of the wider trapezoidal opening 154 in the base 18. The first and second side surfaces 72 and 74 are angled relative to one another so that the flap 60 narrows toward the inner end 66. A slot 76 separates the second side surface 74 of each flap 60 from the first side surface 72 of an adjacent flap 60 and enables movement of the flap relative to the adjacent flap.

The inner end 66 of each flap 60 is angled relative to the outer end 68 of the flap 60. As shown in FIG. 8, the inner end 66 of each flap 60 is angled relative to the outer end 68 of the flap 60 at an angle of approximately one hundred and twenty degrees. An angled junction 160 separates the inner and outer ends 66 and 68 of each flap 60.

The inner end 66 of each flap 60 is connected to the inner end of each adjacent flap so that the inner ends, collectively, form an undivided, annular center portion 80 of the flexible closure member 20. The annular center portion 80 of the flexible closure member 20 is centered on axis A and has an outer diameter equal to the diameter of the upper surface 30 of the central portion 26 of the base 18. An inner diameter 81 of the annular center portion 80 of the flexible closure member 20 is equal to the diameter of the circular hole 36 defined by the radial inner surface 34 of the central portion 66 of the base 18. The center portion 26 of the flexible closure member 20 is planar and includes a rectangular cutout 82 adjacent the inner diameter 81. The rectangular cutout 82 is sized to receive the orientation key 38 on the upper surface 30 of the central portion 26 of the base 18 for aligning the flexible closure member 20 with the base 18.

Four arcuate slots 162 extend through the flexible closure member 20 illustrated in FIG. 8. The four arcuate slots 162 are located at the angled junction 160 between the inner and outer ends 66 and 68 of the flaps 60. Each arcuate slot 162 extends into adjacent flaps 60. A narrow portion 164 of the flexible closure member 20 separates adjacent arcuate slots 162 from one another. The flexible closure member 20 of FIG. 8 includes four narrow portions 164. One narrow portion 164 is associated with each flap 60. The narrow portion 164 forms a hinge for enabling the outer end 68 of the flap 60 to move relative to the inner end 66 of the flap 60.

The flexible closure member 20 of FIG. 8 may be made from a Mylar film, polyester, or a polycarbonate-based material. Preferably, the flexible closure member 20 is formed from a single piece of sheet material having a thickness in the range of 3–7 thousandths of an inch. The flexible closure member 20 may be stamped or thermoformed from the single piece of sheet material. When the center portion 80 of the flexible closure member 20 is fixed relative to the central portion 26 of the base 18, the flaps 60 of the flexible closure member 20 bend at the narrow portions 164 forming the hinges so that the flexible closure member 20 takes the shape shown in FIG. 8.

The pressure relief valve 12' of FIG. 6 is manufactured in the same manner as the pressure relief valve 12 of FIGS. 2–5. The pressure relief valve 12' of FIG. 6 also operates in a manner similar to the pressure relief valve 12 of FIGS. 2–5 for relieving pressure from the passenger compartment 14 of the vehicle 10.

From the above description of the invention, those skilled in the art will perceive improvements, changes and modifications. The pressure relief valve 12 may have a shape other than that illustrated in the figures. For, example the pressure relief valve 12 may be oval or rectangular. Such improvements, changes and modifications within the skill of the art are intended to be covered by the appended claims.

Having described the invention, we claim the following:

1. A pressure relief valve for relieving air pressure from a passenger compartment of a vehicle, the pressure relief valve comprising:

a base having a central portion and a peripheral portion, a plurality of openings extending through the base;

a plurality of flaps for closing the openings of the base, each flap being associated with at least one opening of the plurality of openings and including opposite surfaces against which air pressure acts, an inner end of each flap connected with the central portion of the base and an outer end of each flap being movable relative to the central portion of the base and the other flaps in response to differential air pressure acting on the opposite surfaces for enabling airflow through the at least one associated opening, wherein the inner ends of the plurality of flaps collectively form an undivided center portion of a flexible closure member, the outer ends of the plurality of flaps being separated from one another by slots, the slots enable movement of the outer end of each flap relative to the outer end of adjacent flaps, the flexible closure member being formed from a single sheet of material; and a connector on the base configured to secure the pressure relief valve to the vehicle, wherein the connector is a rim that is molded onto the peripheral portion of the base, the rim including structure for securing the pressure relief valve to the vehicle.

2. The pressure relief valve of claim 1 wherein the structure of the rim includes first and second members, the first member adapted to engage and seal against an interior surface of the vehicle and the second member adapted to engage and seal against an exterior surface of the vehicle.

3. A pressure relief valve for relieving air pressure from a passenger compartment of a vehicle, the pressure relief valve comprising:
   a base having a central portion and a peripheral portion, a plurality of openings extending through the base;
   a plurality of flaps for closing the openings of the base, each flap being associated with at least one opening of the plurality of openings and including opposite surfaces against which air pressure acts, an inner end of each flap connected with the central portion of the base and an outer end of each flap being movable relative to the central portion of the base and the other flaps in response to differential air pressure acting on the opposite surfaces for enabling airflow through the at least one associated opening;
   a connector on the base configured for securing the pressure relief valve to the vehicle; and
   a fastener for fixedly securing the inner end of each flap to the central portion of the base, wherein the fastener is molded into a hole in the central portion of the base, the fastener including a head portion that overlays at least part of the inner end of each flap for fixedly securing the inner end to the central portion of the base.

4. The pressure relief valve of claim 3 wherein the connector is a rim that is molded onto the peripheral portion of the base, the rim and the fastener being molded from identical material.

5. A pressure relief valve for relieving air pressure from a passenger compartment of a vehicle, the pressure relief valve comprising:
   a base having a central portion and a peripheral portion, a plurality of openings extending through the base;
   a plurality of flaps for closing the openings of the base, each flap being associated with at least one opening of the plurality of openings and including opposite surfaces against which air pressure acts, an inner end of each flap connected with the central portion of the base and an outer end of each flap being movable relative to the central portion of the base and the other flaps in response to differential air pressure acting on the opposite surfaces for enabling airflow through the at least one associated opening; and
   a connector on the base configured for securing the pressure relief valve to the vehicle, wherein the central portion of the base is planar and the peripheral portion of the base is frustoconical and extends upward and radially outwardly from the central portion of the base, the plurality of openings extending through the peripheral portion of the base.

6. The pressure relief valve of claim 5 wherein the peripheral portion of the base includes a surface which supports the outer end of each flap in a closed position closing the at least one opening, the peripheral portion of the base enabling movement of the outer end of each flap in a first direction relative to the surface and preventing movement of the outer end in a second direction, opposite the first direction, for enabling airflow through the at least one opening in only the first direction.

7. A method of forming a pressure relief valve for relieving air pressure from a passenger compartment of a vehicle, the method comprising the steps of:
   providing a base having a central portion and a peripheral portion, a plurality of openings extending through the base;
   closing the openings of the base with a plurality of flaps by associating each flap with at least one opening, connecting an inner end of each flap with the central portion of the base, and enabling an outer end of each flap to move relative to the central portion of the base and the other flaps in response to differential pressure acting on opposite surfaces of the flap for enabling airflow through the associated at least one opening; and
   providing a connector on the base that is configured for securing to the pressure relief valve to the vehicle, wherein the step of connecting an inner end of each flap with the central portion of the base further includes the step of providing a fastener for fixedly securing the inner end of each flap to the central portion of the base, wherein the step of providing a fastener for fixedly securing the inner end of each flap to the central portion of the base further includes the steps of molding a fastener into a hole in the central portion of the base, and overlaying at least part of the inner end of each flap with a head portion of the fastener for fixedly securing the inner end to the central portion of the base.

8. The method of claim 7 wherein the step of providing a connector on the base that is configured for securing the pressure relief valve to the vehicle further includes the steps of molding, from identical material as the molded fastener, a rim onto the peripheral portion of the base, and molding structure on the rim for securing the pressure relief valve to the vehicle.

9. A method of forming a pressure relief valve for relieving air pressure from a passenger compartment of a vehicle, the method comprising the steps of:
   providing a base having a central portion and a peripheral portion, a plurality of openings extending through the base;
   closing the openings of the base with a plurality of flaps by associating each flap with at least one opening, connecting an inner end of each flap with the central portion of the base, and enabling an outer end of each flap to move relative to the central portion of the base and the other flaps in response to differential pressure acting on opposite surfaces of the flap for enabling airflow through the associated at least one opening; and
   providing a connector on the base that is configured for securing to the pressure relief valve to the vehicle, providing the plurality of flaps as a flexible closure member formed from a single sheet of material having an undivided center portion formed from the inner ends of the plurality of flaps and the outer ends of the plurality of flaps being separated by slots.

10. The method of claim 9 further including providing the peripheral portion of the base with a first alignment member, and providing the center portion of the flexible closure member with a second alignment member that is adapted to cooperate with the first alignment members for positioning the flexible closure member relative to the base.

11. A method of forming a pressure relief valve for relieving air pressure from a passenger compartment of a vehicle, the method comprising the steps of:
   providing a base having a central portion and a peripheral portion, a plurality of openings extending through the base;
   closing the openings of the base with a plurality of flaps by associating each flap with at least one opening, connecting an inner end of each flap with the central portion of the base, and enabling an outer end of each flap to move relative to the central portion of the base and the other flaps in response to differential pressure acting on opposite surfaces of the flap for enabling airflow through the associated at least one opening; and providing a connector on the base that is configured for securing to the pressure relief valve to the vehicle, providing each flap of the plurality of flaps with at least one hinge for connecting the inner end of the flap with the outer end of the flap and enabling movement of the outer end of the flap relative to the inner end, wherein the step of providing each flap of the plurality of flaps with at least one hinge for connecting the inner end of the flap with the outer end of the flap further includes the step of forming slots in the flap to form at least one narrow portion of material, the narrow portion of material being the at least one hinge.

* * * * *